United States Patent [19]

Wick

[11] 4,324,464
[45] Apr. 13, 1982

[54] PHOTOGRAPHIC APPARATUS WITH AUTOMATIC FOCUSING MEANS

[75] Inventor: Richard Wick, Munich, Fed. Rep. of Germany

[73] Assignee: AGFA-Gevaert Aktiengesellschaft, Leverkusen, Fed. Rep. of Germany

[21] Appl. No.: 177,984

[22] Filed: Aug. 14, 1980

Related U.S. Application Data

[63] Continuation of Ser. No. 874,495, Feb. 2, 1978, Pat. No. 4,240,726.

[30] Foreign Application Priority Data

Feb. 8, 1977 [DE] Fed. Rep. of Germany ....... 2705104

[51] Int. Cl.³ .................. G03B 7/081; G03B 13/20
[52] U.S. Cl. .................................. 354/25; 354/31; 354/43; 352/140; 352/141

[58] Field of Search ............... 354/25, 42, 230, 31, 354/36, 38, 43, 44, 48, 59, 60 R, 60 A, 163, 152, 25 A, 25 P, 25 N, 31 F; 352/140, 141; 250/201, 204, 214 P

[56] References Cited

U.S. PATENT DOCUMENTS 3,830,571 8/1974 Imai et al. .................. 354/25 X
4,047,187 9/1977 Mashimo et al. .................. 354/31 X Primary Examiner—L. T. Hix
Assistant Examiner—William B. Perkey
Attorney, Agent, or Firm—Kontler & Grimes

[57] ABSTRACT

A still camera or motion picture camera wherein the means for monitoring the brightness of a portion of or entire scene transmits signals to an automatic focusing mechanism as well as to the exposure controls. The connection between the output or outputs of the monitoring means and the exposure controls includes elements which can transmit signals denoting the peak value, the integral value or the average value of signals denoting the scene brightness.

10 Claims, 3 Drawing Figures

PHOTOGRAPHIC APPARATUS WITH AUTOMATIC FOCUSING MEANS

This is a continuation, of application Ser. No. 874,495, filed Feb. 2, 1978, now U.S. Pat. No. 4,240,726.

BACKGROUND OF THE INVENTION

The present invention relates to photographic apparatus in general, and more particularly to improvements in still cameras or motion picture cameras which embody automatic focusing means. Still more particularly, the invention relates to improvements in focusing and exposure control means of still cameras or motion picture cameras, and to improvements in means for adjusting the focusing and exposure control means as a function of one or more characteristics of the scene.

OBJECTS AND SUMMARY OF THE INVENTION

An object of the invention is to provide a photographic apparatus (which may constitute a still camera or a motion picture camera) with novel and improved exposure control means and automatic focusing means.

Another object of the invention is to provide the camera with relatively simple, compact and accurate automatic focusing means and with relatively simple, compact, accurate and rugged exposure control means.

A further object of the invention is to provide a novel and improved operative connection between automatic or semiautomatic exposure control means and automatic focusing means.

An additional object of the invention is to provide a photographic apparatus wherein the focusing and the adjustment of exposure controls in dependency on scene brightness (or in dependency on brightness of one or more selected portions of the scene) take place automatically so that the user can devote his or her attention to the selection of the motif, to panning and/or other operations which cannot or should not be automated.

The invention is embodied in a photographic apparatus which comprises photosensitive monitoring means (e.g., including one or more sets of photocells) for generating signals denoting the characteristics of at least a portion of scene light, exposure control means (such exposure control means may include a motor which adjusts the diaphragm and a capacitor which controls the shutter to thereby determine the exposure time), automatic focusing means which is adjustable as a function of the intensity of signals denoting the brightness of a portion of or the entire scene, first signal transmitting means which connects the monitoring means with the control circuit for the motor of the focusing means so that the focusing means is automatically adjusted as a function of the intensity or another characteristic of signals furnished by the monitoring means, and second signal transmitting means connecting the monitoring means with the exposure control means.

The second signal transmitting means preferably includes means for transmitting to the exposure control means signals denoting the peak value, the integral value or the average value of some or all of the signals which are generated by the monitoring means.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
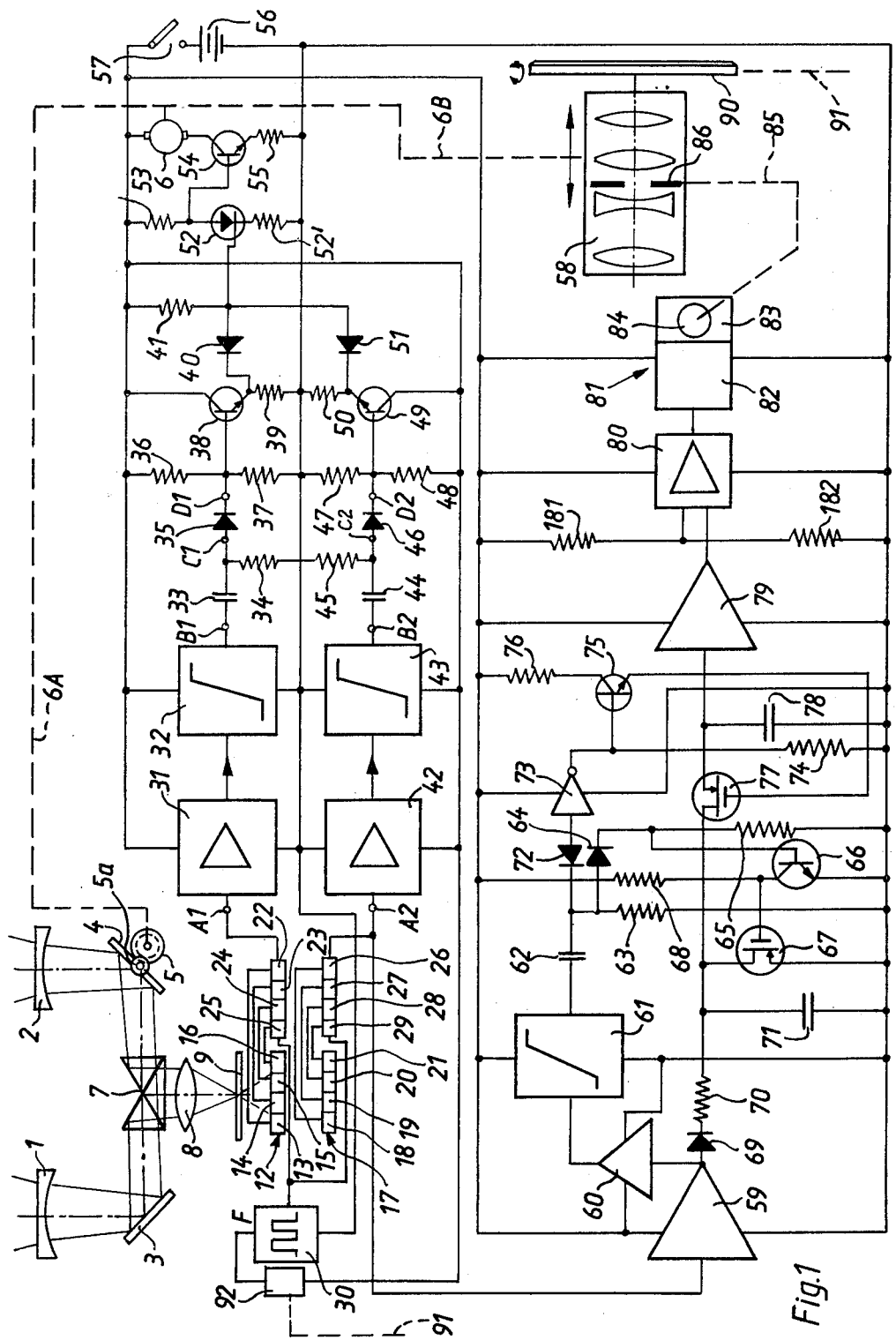
FIG. 1 is a diagrammatic view of a portion of a photographic apparatus which embodies one form of the invention.

Referring to FIG. 1, the operation of the focusing means is based on the split image principle. This focusing means comprises two lenses 1 and 2, a fixed mirror 3 behind the lens 1, a pivotable mirror 4 behind the lens 2, a set of gears 5, 5a which can pivot the mirror 4, an electric motor 6 which can transmit torque to the gear 5 (the operative connection between the output element of the motor 6 and the gear 5 is indicated by the broken line 6A), a split image prism 7, a collector lens 8 and a slotted diaphragm or mask 9.

Figure 2:
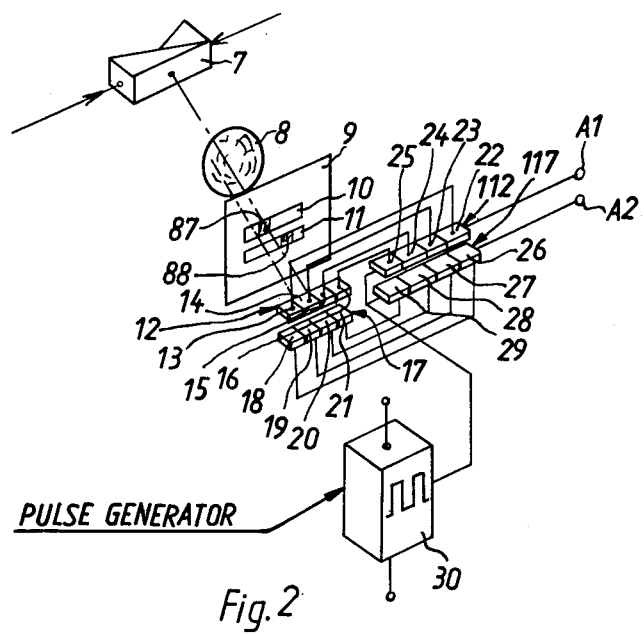
FIG. 2 is a schematic perspective view of a portion of the automatic focusing means and of the monitoring means in the improved photographic apparatus.

As shown in FIG. 2, the mask 9 comprises two elongated parallel slots 10 and 11 which are disposed above each other. The upper slot 10 is located at the level of a first photosensitive monitoring device or receiver 12 which comprises a battery of four aligned photosensitive signal generating elements or cells 13, 14, 15 and 16. The lower slot 11 is located at the level of a second photosensitive monitoring device or receiver 17 which comprises a battery of four aligned photosensitive signal generating elements or cells 18, 19, 20 and 21. The cells 13 to 16 are respectively connected with the first inputs of stages 22, 23, 24 and 25 of an analog shift register 112, preferably a so-called charged coupled device (CCD). The cells 18 to 21 are respectively connected with the first inputs of stages 26, 27, 28 and 29 of a second shift register 117 which is preferably identical with the shift register 112. The stages of the shift registers 112 and 117 further comprise second inputs which receive signal transporting pulses from a pulse generator 30. The shift registers 112, 117 constitute a digital signal processing unit of the monitoring means which further includes the devices 12, 17 and the pulse generator 30, the latter serving to transport signals through the processing unit 112, 117. The output A1 of the shift register 112 is connected with the input of an amplifier 31 and the output of the amplifier 31 is connected with a Schmitt trigger 32. The output B1 of the Schmitt trigger 32 is connected with one plate of a capacitor 33. The other plate of the capacitor 33 is connected with a resistor 34 which is further connected to the negative pole of an energy source 56; the elements 33 and 34 constitute a differentiating circuit. The other plate of the capacitor 33 is further connected with a rectifier 35 via contact C1. The rectifier 35 transmits positive pulses to a contact D1 which is connected with the tap of a voltage divider including resistors 36 and 37. Such tap (and hence the contact D1) is connected with the base of a transistor 38 whose emitter circuit contains a resistor 39. The resistances of the resistors 36 and 37 are selected in such a way that the transistor 38 blocks in the absence of signals at the contact D1.

The emitter of the transistor 38 is connected with a rectifier 40 which is in circuit with a resistor 41.

The output A2 of the second shift register 117 is connected with a series of electrical and electronic components which are identical with the just described components 31 to 40 and include an amplifier 42 (corresponding to 31), a Schmitt trigger 43 (corresponding to 32) having an output B2, a capacitor 44, a resistor 45, a rectifier 46, a voltage divider 47, 48, a transistor 49, a resistor 50 and a rectifier 51. The contacts C2, D2 respectively correspond to similarly referenced contacts C1, D1 in the connection between the shift register 112 and the rectifier 40. The rectifier 51 is connected with the resistor 41, the same as the rectifier 40.

The rectifiers 40 and 51 are further connected to the control electrode of a thyristor 52 whose cathode circuit includes a resistor 52' and whose anode circuit includes a resistor 53. The anode of the thyristor 52 is connected with the base of a switching transistor 54. The winding of the motor 6 is installed in the collector circuit of the transistor 54 and the emitter circuit of this transistor contains a resistor 55. The circuit which is shown in the upper half of FIG. 1 further includes the energy source 56 in series with a master switch 57. The motor 6 can move the picture taking lens 58 in the directions indicated by arrows a and b. The transmission between the output element of the motor 6 and the barrel of the picture taking lens 58 is shown by broken lines, as at 6B.

The length of each light measuring cycle is determined by the characteristics of the pulse generator 30 (namely, by the length of intervals between successive pulses transmitted to the stages of the shift registers 112, 117) and by the number of signal generating elements in the monitoring devices 12, 17 (i.e., by the number of stages in each shift register).

The output A2 of the shift register 117 is also connected with an amplifier 59 whose output is connected with a further amplifier 60. The output of the amplifier 60 is connected with a pulse shaper 61 which transmits a square signal during each transition from an interval of pause between successive measurements of scene brightness to the next measuring cycle and vice versa. The output of the pulse shaper 61 is connected with a differentiating circuit including a capacitor 62 and a resistor 63. The differentiating circuit 62, 63 transmits signals to a diode 64 which transmits positive pulses to a resistor 65 connected with the negative pole of the energy source 56. Furthermore, the diode 64 transmits positive pulses to the base of a transistor 66 whose collector is connected with the control electrode of a field effect transistor 67 and with a resistor 68.

The output of the amplifier 59 is further connected with a semiconductor here shown as a diode 69 in series with a resistor 70 which is connected with one plate of an integrating capacitor 71.

The differentiating circuit 62, 63 is further connected with a diode 72 which transmits negative pulses to an inverter 73. The output of the inverter 73 is connected with a resistor 74 and with the base of a transistor 75 whose collector circuit contains a resistor 76. The emitter of the transistor 75 is connected with the control electrode of a further field effect transistor 77 which can connect the integrating capacitor 71 with a signal storing capacitor 78. The capacitor 78 is connected with the input of an impedance reversing circuit 79 whose output is connected with the non-inverting input of an operational amplifier 80. The inverting input of the amplifier 80 is connected with the tap of a voltage divider including the resistors 181 and 182. The output of the operational amplifier 80 is connected with the control circuit 81 of a stepping motor 84. The control circuit 81 includes a digital converter 82 and a regulating circuit 83 for the stepping motor 84. The motor 84 can adjust a diaphragm 86 of the exposure control means by way of a mechanical transmission 85 (indicated by broken lines). The regulating circuit 83 includes a pulse generator (not specifically shown).

The distribution of light which impinges upon the cells 13 to 16 and 18 to 21 of the receivers 12 and 17 depends on the nature of the subject to be photographed. The two images 87, 88 (see FIG. 2) which are transmitted by prism 7 and optical element 8 via slots 10, 11 of the mask 9 are assumed to be shifted with respect to each other.

Each pulse which is transmitted by the pulse generator 30 results in transport of signals (transmitted by cells 13-16 and 18-21 to the stages 22-25 and 26-29 of the respective shift registers 112 and 117) toward the outputs A1, A2 of the respective shift registers. Thus, each combination of four simultaneously transmitted signals leaves the respective shift register in response to transmission of four successive pulses from the pulse generator 30. The shift registers 112, 117 are thereupon automatically reset so that their stages can receive fresh sets of four signals each, and such signals begin to advance toward the outputs A1, A2 of the shift registers in response to transmission of the fifth, sixth, etc. pulses.

If the camera is properly focused upon the subject, the images 87 and 88 overlap each other and the rectifiers 40 and 51 are blocked simultaneously. Consequently, the control electrode of the thyristor 52 receives positive voltage via resistor 41 so that the thyristor 52 becomes conductive and the winding of the motor 6 is deenergized. In other words, the motor 6 is arrested in that position in which the images 87 and 88 overlap, i.e., the image of the subject is sharply focused in the film plane.

The integrating capacitor 71 integrates each set of four signals. During the intervals between successive measurements, the diode 69 prevents or blocks discharge of integrated voltage. The positive pulse which is generated during the initial stage of each measuring cycle renders the transistor 66 conductive for a short interval of time whereby the field effect transistor 67 becomes conductive, also for a short interval of time, and the integrating capacitor 71 discharges. This insures that the capacitor 71 is discharged prior to start of each measuring cycle.

The negative pulse which is generated during the last stage of each measuring cycle is transmitted to the inverter 73 via diode 72 and appears as a negative signal at the base of the transistor 75. Thus, the transistor 75 blocks for a short interval of time and the normally blocking field effect transistor 77 becomes conductive, also for a short interval of time. This enables the integrating capacitor 71 to discharge into the signal storing capacitor 78 (which is either discharged or ready to accept a charge). Such signal voltage is stored in the capacitor 78 during an entire cycle and is thereupon transmitted to the operational amplifier 80 via impedance reversing circuit 79. In the absence of equilibrium, the motor 84 is started to adjust the diaphragm 86 via transmission 85.

If the capacitor 78 is used in a still camera to determine the exposure time (in a manner not specifically shown in the drawing), the pulse generator 30 is preferably energized only during the measuring cycle prior to the making of an exposure, especially if the intensity of scene light is measured via objective. For example, the pulse generator 30 can be deenergized by a mirror 90 which is located in the path of incoming scene light and is moved to permit such light to reach the foremost unexposed film frame. The movement of the mirror 90 can be used to deenergize the pulse generator 30. The latter is started again when the mirror 90 returns to the normal position in which it extends across the path of incoming scene light. FIG. 1 shows a mechanical connection 91 between the mirror 90 and a switch 92 in the conductor means between the input F of the pulse generator 30 and the energy source 56. The switch 92 opens when the mirror 90 permits scene light to reach the foremost unexposed film frame.

If the light intensity is not measured via picture taking lens 58, the pulse generator 30 can remain operative during the making of exposures.

An advantage of the monitoring means (12-30) including the receivers 12 and 17 is that such monitoring means performs two important functions, namely, the signals which are generated by the cells 13-16 and 18-21 are transmitted (via elements 31-55) to the control circuit of the motor 6 of the automatic focusing means 1-11, and the signals which are generated by the cells 18-21 are transmitted (via elements 59-80) to the control circuit 81 for the motor 84 of the exposure control means 81-86.

Another advantage of the improved combination of monitoring means, focusing means, exposure control means and the two signal transmitting means is that, since the monitoring means which transmits signals for automatic adjustment of focusing means constitutes a photosensitive receiver of the exposure control means, one can resort to the so-called spot measurement. In other words, the brightness of the most important part of the scene to be imaged (i.e., of that part which is automatically focused in the film plane) determines the setting of exposure control means. Thus, the brightness of the most important part of the scene is the standard or norm which determines the aperture size and/or the exposure time during imaging of the respective scene onto the foremost unexposed film frame.

Figure 3:
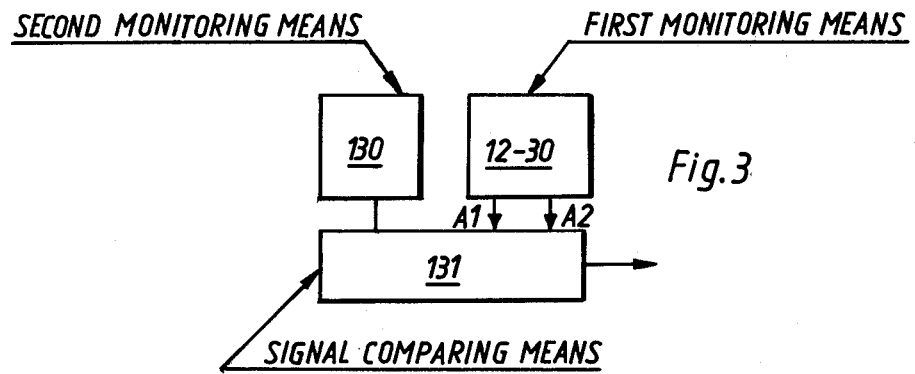
FIG. 3 is a diagram of a modification of the monitoring means shown in FIGS. 1 and 2.

It is often desirable to provide the photographic apparatus with second monitoring means (shown at 130 in FIG. 3) which evaluates the brightness of the entire scene. The output of such second monitoring means is connected with a signal comparing device 131 which also receives signals from the output or outputs A1, A2 of the illustrated first monitoring means 12-30. This enables the photographer to decide whether the adjustment of focusing means and/or exposure control means should be effected as a result of evaluation of a part of or the entire subject or scene. The extent or intensity of evaluation of the spot field and of the remaining or entire part of the scene can be regulated in dependency on the sensitivity of the first and/or second monitoring means.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed is:

1. In a photographic apparatus, the combination of monitoring means including means for generating first signals denoting the characteristics of at least a portion of scene light during individual monitoring cycles; adjustable exposure control means; automatic focusing means, said focusing means being adjustable as a function of the intensity of said first signals; first means for transmitting said first signals from said monitoring means to said focusing means; and second means for transmitting from said monitoring means to said exposure control means second signals denoting the peak value or the integral value of said first signals, including means for integrating said first signals during monitoring of said portion of scene light and means for blocking transmission of second signals from said integrating means back to said monitoring means during intervals between successive monitoring cycles.

2. The combination of claim 1, wherein said monitoring means further comprises a digital signal processing unit and means for transporting said first signals through said processing unit.

3. The combination of claim 2, wherein said transporting means comprises a pulse generator.

4. The combination of claim 3, wherein said processing unit comprises at least one shift register having stages connected with said signal generating means and with said pulse generator, said shift register having output means connected with said first and second signal transmitting means.

5. The combination of claim 4, wherein said shift register is a charged coupled device.

6. The combination of claim 2, wherein said focusing means includes a mask having a plurality of slots including first and second slots and a split image optical system for directing first and second images of a selected portion of the scene through said first and second slots as long as said focusing means does not focus the image of said selected portion in the film plane, said signal generating means including a group of photosensitive elements behind each of said slots and said processing unit comprising a shift register for each of said groups, each of said shift registers having stages connected with the respective photosensitive elements and with said transporting means, said shift registers further having outputs at least one of which is connected with said first and second signal transmitting means.

7. The combination of claim 2, wherein said processing unit comprises at least one multi-stage shift register and said transporting means comprises a pulse generator, the duration of each monitoring cycle being a function of the length of intervals between the generation of successive pulses by said pulse generator and the number of stages in said shift register.

8. The combination of claim 2, wherein said transporting means comprises a pulse generator and said photographic apparatus is a single lens reflex camera further including a picture taking lens, a mirror movable between first and second positions in which said mirror respectively permits and prevents scene light from reaching the film, and means for energizing said pulse generator in said second position of said mirror.

9. The combination of claim 1, wherein said blocking means includes semiconductor means.

10. The combination of claim 1, wherein said second signal transmitting means further comprises signal storing means and pulse shaper means arranged to furnish first and second pulses at the start and on termination of each monitoring cycle, said first pulses being operative to render said integrating means receptive to signals from said monitoring means and said second pulses being operative to establish a connection between said integrating means and said storing means.

* * * * *